United States Patent
Carpenter et al.

(10) Patent No.: US 10,108,352 B2
(45) Date of Patent: Oct. 23, 2018

(54) INCREMENTAL REPLICATION OF A SOURCE DATA SET

(71) Applicant: International Business Machines Corporation, Armonk, NY (US)

(72) Inventors: Preston A. Carpenter, Vail, AZ (US); Dash D. Miller, St. Louis Park, MN (US); David C. Reed, Tucson, AZ (US); Esteban Rios, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/637,151

(22) Filed: Mar. 3, 2015

(65) Prior Publication Data
US 2016/0259574 A1    Sep. 8, 2016

(51) Int. Cl.
*G06F 3/06*    (2006.01)
*G06F 11/20*    (2006.01)
*G06F 11/14*    (2006.01)

(52) U.S. Cl.
CPC ............ *G06F 3/0619* (2013.01); *G06F 3/065* (2013.01); *G06F 3/0683* (2013.01); *G06F 11/1446* (2013.01); *G06F 11/2094* (2013.01)

(58) Field of Classification Search
CPC ...... G06F 3/0619; G06F 3/065; G06F 3/0683; G06F 8/68; G06F 11/14
See application file for complete search history.

(56) References Cited

U.S. PATENT DOCUMENTS

| | | | |
|---|---|---|---|
| 3,862,615 A | 1/1975 | Liou | |
| 5,235,695 A * | 8/1993 | Pence | G11B 20/10 360/134 |
| 6,799,258 B1 | 9/2004 | Linde | |
| 6,996,586 B2 * | 2/2006 | Stanley | G06F 11/1451 707/999.203 |
| 7,000,145 B2 * | 2/2006 | Werner | G06F 11/2082 707/999.202 |
| 7,024,530 B2 | 4/2006 | Jarvis et al. | |
| 7,047,390 B2 | 5/2006 | Factor et al. | |
| 7,120,768 B2 | 10/2006 | Mizuno et al. | |
| 7,124,323 B2 * | 10/2006 | Sanchez | G06F 11/2064 714/16 |
| 7,240,131 B1 | 7/2007 | Bjomsson et al. | |

(Continued)

OTHER PUBLICATIONS

Webopedia, "Wildcard Character", Oct. 1, 2002, pp. 1, https://web.archive.org/web/20021001193432/http://www.webopedia.com/TERM/W/wildcard_character.html.*

(Continued)

*Primary Examiner* — Christopher D Birkhimer
(74) *Attorney, Agent, or Firm* — Kunzler, PC (57) ABSTRACT

For performing incremental replication of a data set, a source data module identifies a source data set, the source data set including a set of storage locations on a source volume, a target data module that defines the target data set in response to the source data module identifying the source data set, a mapping module that stores a replication relationship table, the replication relationship table mapping the defined data set to a target data set, the target data set including a set of storage locations on a target volume, and a replication module that performs an incremental copy of data stored at the source data set based on the replication relationship.

20 Claims, 5 Drawing Sheets

(56) References Cited

U.S. PATENT DOCUMENTS

| | | | |
|---|---|---|---|
| 7,249,278 B2* | 7/2007 | Fukuda | G06F 3/0607 711/114 |
| 7,257,676 B2* | 8/2007 | Corbett | G06F 11/1096 711/114 |
| 7,395,402 B2* | 7/2008 | Wilson | G06F 11/1076 711/162 |
| 7,409,510 B2 | 8/2008 | Werner et al. | |
| 7,437,676 B1 | 10/2008 | Magdum et al. | |
| 7,461,100 B2* | 12/2008 | Spear | G06F 11/2069 |
| 7,467,266 B2 | 12/2008 | Burton et al. | |
| 7,523,408 B2 | 4/2009 | Barrios et al. | |
| 7,571,293 B1 | 8/2009 | LeCrone et al. | |
| 7,596,658 B2* | 9/2009 | Tsurudome | G06F 3/0604 711/112 |
| 7,702,670 B1 | 4/2010 | Duprey et al. | |
| 7,702,866 B2* | 4/2010 | Beardsley | G06F 11/2069 711/162 |
| 7,716,185 B2 | 5/2010 | Thompson et al. | |
| 7,747,576 B2* | 6/2010 | Micka | G06F 11/2074 707/646 |
| 8,117,413 B2* | 2/2012 | Pace | G06F 3/0617 707/641 |
| 8,140,785 B2 | 3/2012 | Kalos et al. | |
| 8,161,253 B2 | 4/2012 | Suarez | |
| 8,200,637 B1* | 6/2012 | Stringham | G06F 11/1451 707/670 |
| 8,271,753 B2 | 9/2012 | Nemoto et al. | |
| 8,312,490 B2* | 11/2012 | Yap | G11B 27/034 386/296 |
| 8,429,363 B2* | 4/2013 | Benhase | G06F 11/1451 707/646 |
| 8,433,867 B2 | 4/2013 | Eastman et al. | |
| 8,433,870 B2* | 4/2013 | Benhase | G06F 11/1451 707/646 |
| 8,468,316 B2 | 6/2013 | Beeken et al. | |
| 8,515,911 B1 | 8/2013 | Zhou et al. | |
| 8,572,045 B1* | 10/2013 | Shah | G06F 17/30117 707/674 |
| 8,635,423 B1* | 1/2014 | Blumenau | G06F 3/0607 711/170 |
| 8,655,841 B1 | 2/2014 | Sridharan | |
| 8,745,006 B2 | 6/2014 | Hiwatashi et al. | |
| 8,775,390 B2* | 7/2014 | Anglin | G06F 17/3015 707/693 |
| 8,793,290 B1* | 7/2014 | Pruthi | G06F 3/0604 707/821 |
| 8,806,281 B1 | 8/2014 | Dowers, II et al. | |
| 8,832,028 B2* | 9/2014 | Susairaj | G06F 17/30306 707/640 |
| 8,874,532 B2* | 10/2014 | Anglin | G06F 17/3015 707/693 |
| 8,910,030 B2* | 12/2014 | Goel | G06F 11/1076 714/763 |
| 8,914,578 B2* | 12/2014 | DeNeui | G06F 3/0607 711/114 |
| 9,483,355 B1 | 11/2016 | Meiri et al. | |
| 2003/0158869 A1* | 8/2003 | Micka | G06F 11/2074 |
| 2003/0177149 A1* | 9/2003 | Coombs | G06F 11/1448 |
| 2004/0073831 A1* | 4/2004 | Yanai | G06F 3/0601 714/6.32 |
| 2004/0243778 A1 | 12/2004 | Barrios et al. | |
| 2004/0243945 A1 | 12/2004 | Benhase et al. | |
| 2004/0260869 A1* | 12/2004 | Factor | G06F 3/0614 711/112 |
| 2004/0267706 A1 | 12/2004 | Springer, Sr. et al. | |
| 2005/0235337 A1* | 10/2005 | Wilson | G06F 11/1076 725/134 |
| 2006/0161721 A1 | 7/2006 | Iwamura et al. | |
| 2006/0174003 A1* | 8/2006 | Wilson | H04L 63/083 709/225 |
| 2006/0212667 A1 | 9/2006 | Mikami | |
| 2006/0218370 A1 | 9/2006 | Satoyama et al. | |
| 2007/0083710 A1* | 4/2007 | Corbett | G06F 11/1096 711/114 |
| 2007/0180204 A1* | 8/2007 | Wilson | G11B 19/02 711/159 |
| 2007/0220322 A1 | 9/2007 | Mikami | |
| 2008/0005146 A1 | 1/2008 | Kubo et al. | |
| 2009/0228658 A1 | 9/2009 | Nagai et al. | |
| 2011/0167044 A1 | 7/2011 | Hiwatashi et al. | |
| 2011/0167234 A1 | 7/2011 | Nishibori et al. | |
| 2011/0191299 A1 | 8/2011 | Huynh Huu et al. | |
| 2011/0307660 A1* | 12/2011 | Yang | G06F 11/1076 711/114 |
| 2012/0089795 A1* | 4/2012 | Benhase | G06F 11/1451 711/162 |
| 2012/0216009 A1 | 8/2012 | Benhase et al. | |
| 2012/0221823 A1* | 8/2012 | Benhase | G06F 11/1451 711/165 |
| 2012/0260051 A1 | 10/2012 | Maki et al. | |
| 2013/0054531 A1* | 2/2013 | Susairaj | G06F 11/2061 707/640 |
| 2013/0054545 A1* | 2/2013 | Anglin | G06F 17/3015 707/693 |
| 2013/0054906 A1* | 2/2013 | Anglin | G06F 17/3015 711/159 |
| 2013/0254833 A1* | 9/2013 | Nicodemus | G06F 21/55 726/1 |
| 2013/0290626 A1* | 10/2013 | Sundrani | G06F 11/1096 711/114 |
| 2013/0339297 A1* | 12/2013 | Chen | G06F 17/30581 707/624 |
| 2013/0339302 A1* | 12/2013 | Zhang | G06F 17/30581 707/649 |
| 2013/0339303 A1* | 12/2013 | Potter | G06F 17/30581 707/649 |
| 2013/0339319 A1* | 12/2013 | Woodward | G06F 17/30581 707/692 |
| 2013/0339471 A1* | 12/2013 | Bhargava | G06F 17/30581 709/213 |
| 2013/0339643 A1* | 12/2013 | Tekade | G06F 17/30581 711/162 |
| 2014/0052952 A1* | 2/2014 | Anglin | G06F 17/3015 711/166 |
| 2014/0089581 A1* | 3/2014 | DeNeui | G06F 3/0607 711/114 |
| 2014/0223130 A1* | 8/2014 | Dudgeon | G06F 12/023 711/165 |
| 2014/0223133 A1* | 8/2014 | Dudgeon | G06F 12/023 711/171 |
| 2015/0324280 A1 | 11/2015 | Carpenter | |

OTHER PUBLICATIONS

ViceVersa, About Synchronization (One-Way, Two-Way), Backup and Replication, May 13, 2008, pp. 1-4, https://web.archive.org/web/20080513150005/http://www.tgrmn.com/web/kb/item78.htm.*

ViceVersa, What Is the Difference Between One-Way and Two-Way Synchronization?, Oct. 13, 2005, pp. 1-2, https://web.archive.org/web/20051013085336/http://www.tgrmn.com/web/kb/item34.htm.*

SynametricsTechnologies, "Two-Way File Synchronization", Jan. 27, 2011, pp. 1-2, https://web.archive.org/web/20110127120735/http://web.synametrics.com/SyncrifyTwoWaySync.htm.*

Comodo Group, "Selecting the Backup Format", Jun. 3, 2014, pp. 1-3, https://web.archive.org/web/20140603022324/http://help.comodo.com/topic-9-1-455-4994-.html.*

HighPoint Technologies, Inc., "Expanding Storage Capacity—A Primer", Oct. 22, 2007, pp. 1-3, https://web.archive.org/web/20071022225100/http://www.highpoint-tech.com/PDF/Expanding_Storage_Capacity-A_Primer.pdf.*

Microsemi, How to Use Online Capacity Expansion (OCE) With an Adaptec Raid Controller?, Jun. 28, 2002, pp. 1-2, http://ask.microsemi.com/app/answers/detail/a_id/3883/~/how-to-use-online-capacity-expansion-%28oce%29-with-an-adaptec-raid-controller-%3F.*

(56) References Cited

OTHER PUBLICATIONS

QNAP, "Oneline Raid Level Migration", Apr. 22, 2013, pp. 1-7, https://www.qnap.com/en/how-to/tutorial/article/online-raid-level-migration.*

"Query Flashcopy," z/VM V5R4.0 CP Commands and Utilities Reference, SC24-608107, http://publib.boulder.ibm.com/infocenter/zvm/v5r4/index.jsp topic=/com.ibm.zvm.v54.hcpb7/qflashcy.htm , 6 pages.

U.S. Appl. No. 14/271,141, Office Action Summary, dated Dec. 21, 2015.

U.S. Appl. No. 14/271,141, Office Action Summary, dated Aug. 11, 2016.

U.S. Appl. No. 14/271,141, Office Action Summary, dated Jan. 27, 2017.

ISPF—Allocating a New Data Set, published by Western Illinois University in 2001, retrieved on-line Jun. 27, 2017, (https://mvs.wiu.edu/stumvs/TSO/ISPFAllocateDataSet.html) hereinafter "WIU", p. 1-6.

U.S. Appl. No. 14/271,141, Office Action Summary, dated Aug. 1, 2017.

\* cited by examiner

| Source Data Set ID 304 | Source Location 306 | Target Data Set ID 308 | Target Location 310 | ⌐302 |
|---|---|---|---|---|
| Source Data Set ID 304 | Source Location 306 | Target Data Set ID 308 | Target Location 310 | ⌐302 |
| Source Data Set ID 304 | Source Location 306 | Target Data Set ID 308 | Target Location 310 | ⌐302 |

| Source Extent Range 312 |
|---|
| Source Volume 314 |
| Source Extent Range 312 |
| Source Volume 314 |

| Target Extent Range 316 |
|---|
| Target Volume 318 |
| Target Extent Range 316 |
| Target Volume 318 |

INCREMENTAL REPLICATION OF A SOURCE DATA SET

FIELD

The subject matter disclosed herein relates to data replication and more particularly relates to performing an incremental replication of a source data set to a target data set.

BACKGROUND

Flash copy relationships are often established in order to replicate data units. Incremental flash copy creates a snapshot copy only of changed data and is only available at the volume level.

BRIEF SUMMARY

A method for data replication is disclosed. An apparatus and computer program product also perform the functions of the method, the computer program product comprising a computer readable storage medium having program instructions embodied therewith. The method for data replication includes receiving partially qualified data set name, identifying a source data set on a source volume based on the partially qualified data set name, generating a replication relationship table that maps the source data set to a target data set on a target volume, and performing an incremental copy of data stored in the source data set based on the replication relationship table.

An apparatus for data replication includes a source data module that identifies a source data set from a partially qualified data set name, the source data set including a set of storage locations on a source volume, a target data module that defines the target data set in response to the source data module identifying the source data set, a mapping module that stores a replication relationship table, the replication relationship table mapping the source data set to a target data set, the target data set including a set of storage locations on a target volume, and a replication module that periodically performs an incremental copy of data stored at the source data set based on the replication relationship table, wherein at least a portion of the source data module, target data module, mapping module, and replication module comprise one or more of hardware and executable code, the executable code stored on one or more computer readable storage media.

A computer program product for data replication includes program instructions readable/executable by a processor to cause the processor to: identify a source data set on a source volume based on a partially qualified data set name, generate a replication relationship table that correlates the source data set with a target data set on a target volume, perform an incremental copy of data stored in the source data set based on the replication relationship table, monitor for a change to the source data set, and update the relationship table in response to a change to the source data set.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server and proxy computers via loading a computer readable storage medium such as a CD, DVD, etc., the computer program product may be automatically or semi-automatically deployed into a computer system by sending the computer program product to a central server or a group of central servers. The computer program product is then downloaded into the client computers that will execute the computer program product. Alternatively the computer program product is sent directly to the client system via e-mail. The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers, and network software that have been tested to work with the computer program product. Those operating systems, version numbers, and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

Generally, embodiments of the disclosure allow users to select groups of data sets or individual data sets to participate in incremental flash copy relationships. Allowing a more granular selection of what participates in an incremental flash copy relationship, allows for target space requirements to be significantly less.

Users may specify fully or partially qualified data set names to participate in incremental flash copy. Incremental flash copy relationships are then established for those extent ranges allocated to the specified data sets. The data sets are then monitored during end of volume request and delete/define requests. As the data sets extend, the incremental flash copy relationship information is updated, and additional extent range is added to the set of tracks in the incremental flash copy relationship. If the data set is deleted the incremental flash copy relationship is terminated. If the data set is redefined, the previous relationship is withdrawn and a new relationship is created.

A data set incremental flash copy table (DIFT) is used which contains information regarding the participants of the data set level incremental flash copy. The user passes information regarding the source name, target name, and target device or storage group. The fully or partially qualified data set name passed in is used to select source data sets, and the physical location of those data sets is populated in the table. Target data sets may be allocated based on the target name and target device or storage group passed in. Once allocated, those extent ranges are also kept in the table.

Once a data set is identified, the invention establishes incremental flash copy relationships for the data set. After this point, existing Change Recording technology monitors for changes to the source tracks, and the invention copies changed tracks to the target data set on subsequent incremental flash copy establishes. Until removed from this invention, all specified data sets are monitored for updates that require changes to the incremental flash copy relationships. These updates include, a data set extending, a data set being deleted, a data set being moved or redefined.

When a source data set extends that is being monitored, notification may be received of the end of volume call and the same end of volume call issued against the target data set, causing the target data set to also extend with the same number of extents. The newly added extent ranges from the source and target may then be added to the DIFT. During the next execution of the incremental flash copy, the first invocation of the new extent range starts Change Recording.

When a source data set being monitored is deleted, or a user indicates to withdraw an existing incremental flash copy relationship, the entire entry is deleted from the DIFT and the source data set is no longer monitored for updates that would affect an incremental flash copy relationship. The DIFT table is used to determine which extents require withdrawal of the incremental flash copy relationship.

When a source data set being monitored is moved, notification may be received of the move. First, an incremental flash copy withdrawal is issued against the source extent ranges and the move takes place. Once the move is complete, the volume and extent ranges of where the data set was moved are identified and the DIFT updated to reflect the new location information. During the next execution of an incremental flash copy, the new relationships are established between the new source and targets with Change Recording turned on.

Figure 1:
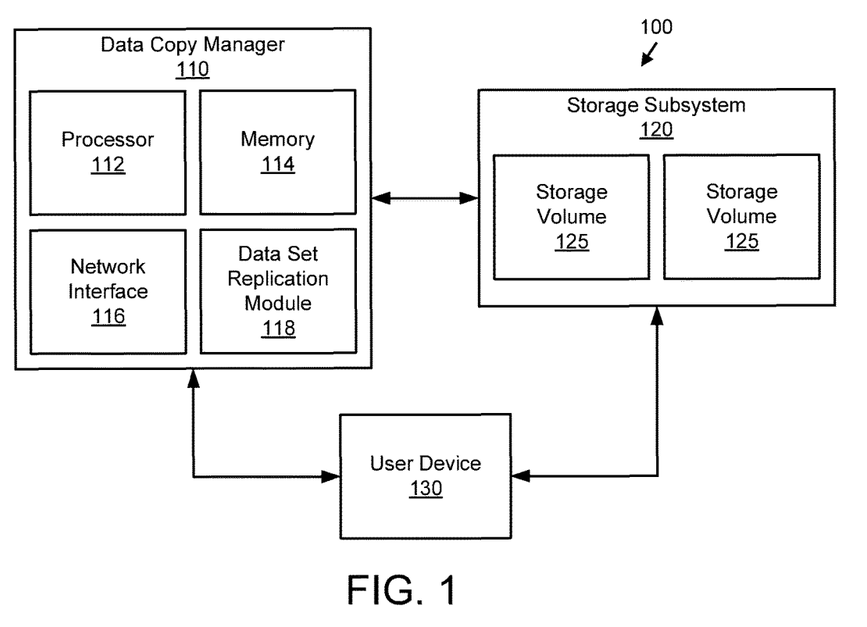
FIG. 1 is a schematic block diagram illustrating one embodiment of a data processing system in accordance with one embodiment of the present invention.

FIG. 1 is a schematic block diagram illustrating one embodiment of a data processing system 100. The data processing system 100 may include a data copy manager 110, at least one storage subsystem 120, and at least one user device 130. The user device 130 may be any computer device or computer system capable of storing and retrieving data via the storage subsystem 120. Further, the user device 130 may also be capable of sending instructions to the data copy manager 110 for backing up the storage subsystem 120. In one embodiment, the user device 130 may include one or more mainframe computers manufactured by International Business Machines (IBM) of Armonk, N.Y., and executing a Z/OS® operating system from IBM.

The data copy manager 110 includes a processor 112, a memory 114, a network interface 116, and a data set replication module 118. The data copy manager 110, in one embodiment, is configured to identify a source data set, correlate the source data set with a target data set, and incrementally copy data stored in the source data set onto the target data set. The data copy manager 110 is discussed in further detail below, in reference to FIG. 2.

The storage subsystems 120, in one embodiment, includes a plurality of storage volumes 125 for storing user data. As used herein, a storage volume is a logical drive having an accessible storage area with a file system. In some embodiments, a storage volume 125 may be stored on a single physical drive. In some embodiments, a storage volume 125 may be stored on a single partition within a physical drive. In some embodiments, a plurality of storage volumes 125 may be stored on a single physical drive. In other embodiments, a single storage volume 125 may be stored over a plurality of physical drives.

The data copy manager 110, in some embodiments, is configured to replicate data from a source storage volume 125 into a target source volume 125. The source storage volume 125 is the "source" of the user data. It is the source storage volume 125 where user data is originally stored (e.g., by an application) and where user data is typically retrieved. The target data volume 125, on the other hand, is the location where the user data copied. The user data may be restored to the source volume from the target volume in the event that data recovery is needed, for example, due to data deletion or corruption.

The data in the storage subsystems 120 may be stored on extents. As used herein, an extent refers to a contiguous area of storage on a storage device. Data stored within the storage subsystem 120 may be organized into a plurality of data sets. As used herein, a data set refers to a collection of data, such as a collection of files, track, extents, or the like. For example, a data set may comprise a database table or data matrix. The data set refers to the collection (e.g., the organization), rather than the data (e.g., values) stored within the collection. In one embodiment, a storage volume 125 may comprise a plurality of data sets. In another embodiment, a single data set may be stored over a plurality of storage volumes 125. A storage volume 125 may include a plurality of extents which may be organized into one or more data sets, each data set including one or more extents.

In some embodiments, the storage subsystem 120 may comprise one or more storage controllers and one or more storage devices including hard disk drives, semiconductor storage devices, optical storage devices, micromechanical storage devices, and combinations thereof. The storage devices provide the physical media upon which data is stored. In certain embodiments, each storage devices contains one or more storage volumes 125. In certain embodiments, a single storage volume 125 may be stored over a plurality of storage devices. The storage subsystems 120 may store data for the user device 130.

In one embodiment, the data copy manager 110 replicates data of a source data set to a target data set using FLASH-COPY® software manufactured by IBM. While the data copy manager 110 is described as using FLASHCOPY® software, it will be understood that other data replication software may be used. In FLASHCOPY® software, an incremental flash copy relationship may be established between a first data set of a source volume 125 on the storage subsystem 120 (e.g., a source data set) and a second data set of a target storage volume 125 the storage subsystem 120 (e.g., a target data set). The incremental flash copy relationship maps the source data set to the target data set for or incrementally backing up the source data set. As used herein, an incremental copy refers to a partial copy of the data consisting of copying changes made to the source data since a previous copy was made. In some embodiments, the data copy manager 110 may perform a full flash copy (e.g., a point-in-time snapshot copy of the data set) of the target data set upon defining the incremental flash copy relationship. The flash copy relationships may be established responsive to instructions from a user (e.g., a system administrator) via the user device.

Currently, incremental flash copy relationships are only available for an entire storage volume, and not for individual data sets within a particular storage volume. The embodiments described herein identify a source data set in an incremental flash copy relationship with a target data set using a data set incremental flash copy table (DIFT), as will be described hereafter. The DIFT is used to manage incremental flash copy relationships among data sets in the system 100.

Figure 2:
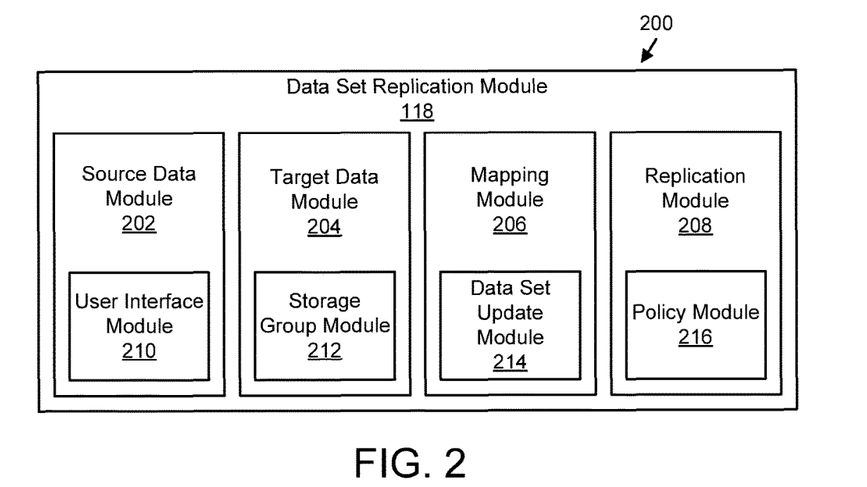
FIG. 2 is a schematic block diagram illustrating one embodiment of a data replication apparatus in accordance with one embodiment of the present invention.

FIG. 2 is a schematic block diagram illustrating one embodiment of a replication apparatus 200. The replication apparatus 200 includes a data set replication module 118, such as the data set replication module 118 described above with reference to FIG. 1. In one embodiment, the data set replication module 118 includes a source of data module 202, a target data module 204, a mapping module 206, and a replication module 208. In further embodiments, the data set replication module 118 may include one or more of: a user interface module 210, a storage group module 212, a data set update module 214, and a policy module 216. The modules 202-216 of the data set replication module 118 may be connectively coupled to one another, for example via a computer bus or other communication means.

The source data module 202, in one embodiment, is configured to identify a source data set. In some embodiments, the source data module 202 identifies the source data set from a partially qualified data set name. As used herein, a partially qualified data set name refers to a data set name in which not all qualifiers are spelled out completely. For example, a partially qualified data set name may include a wildcard character to represent a qualifier and/or a portion of a qualifier. In other embodiments, the source data module 202 identifies the source data set from a fully qualified data set name. A fully qualified data set, as used herein, is one in which all qualifiers are completely spelled out. The source data module 202 may search and/or filter a catalog of data set names using the received data set name.

In one embodiment, the source data set includes a set of storage locations on a storage volume. The source data set may be identified by one or more identifier including: a logical name, a unique identifier, and the like. In one embodiment, the set of storage locations includes one or more extents. In another embodiment, the set of storage locations includes a grouping of non-contiguous extents, such that the set of storage locations includes a range of extents where one or more extents within the range do not belong to the data set.

In some embodiments, the source data module 202 may define a new source data set that includes each data set matching the partially qualified data set name in response to receiving a partially qualified data set name. Beneficially, this may allow a user to establish a single incremental flash copy relationship for a plurality of related data sets. In other embodiments, the source data module 202 may identify a plurality of source data sets corresponding to each data set matching the partially qualified data set name, wherein the mapping module 206 correlates each of the plurality of data source data sets to a target data sets in the replication relationship table. Beneficially, this may allow a user to populate the replication relationship table with a plurality of incremental flash copy relationships via a single instruction.

In some embodiments, the source data module 202 identifies the source data set by determining the set of storage locations corresponding to a name/identifier of the source data set. For example, the source data module 202 may use the name/identifier of the source data set to look up the corresponding set of storage locations in a lookup table or similar data structure. In certain embodiments, the source data module 202 receives (e.g., via user input) the name/identifier of the source data set and proceeds to identify the corresponding set of storage locations. In certain embodiments, the source data module 202 may prompt a user (e.g., a system administrator) for the name/identifier of the source data set and determine a set of storage locations corresponding to response.

In certain embodiments, the source data module 202 includes a user interface module 210 that receives user input defining the source data set, as will be described hereafter. The source data module 202 may identify the source data set from data set information, such as a partially qualified data set name, received by the user interface module 210.

The target data module 204, in one embodiment, is configured to define a target data set in response to the source data module 202 identifying a source data set. In certain embodiments, the target data module 204 allocates a set of storage locations on the target volume (e.g., extents) for use by the source data set, the one or more allocated storage locations defining the target data set. In some embodiments, the target data module 204 identifies a previously allocated target data set belonging to the source data set (for example, if the named source data set was moved). The target data module 204 may indicate the target data set (including name and extent ranges) to the mapping module 206, wherein the mapping module 206 associates the source data set with the target data set in the replication relationship table.

In one embodiment, this target data module 204 receives data set information such as a target name, a target device, and/or a storage group, wherein the target data module and defines the target data set based on the data set information. For example, the target name may identify a specific target volume and/or a specific target data set. The target data module 202 may identify a plurality of extents on the specific target volume and/or belonging to the specific target data set and allocate these to the source data set. The data set information may be user input received from the user interface module 210, as will be described hereafter.

In another embodiment, the target data module 204 may receive a target device name identifying a physical device, wherein the target data module 204 allocates a target data set within the target device. In one embodiment the allocated target data set on the target device may be part of a storage volume 125 located on the target device. In another embodiment, the allocated target data set on the target device may be spread across multiple storage volumes 125 located on the target device. In yet another embodiment, the target data module may receive a storage group from the user, wherein the target data module 204 allocates the target data set from the storage group. In some embodiments, the target data module 204 includes a storage group module 212 that identified the storage group from received data set information, as will be described hereafter.

The mapping module 206, in one embodiment, is configured to store a replication relationship table that maps the source data set to a target data set. In one embodiment, the replication relationship table includes a data set incremental flash copy table (DIFT). The mapping module 206 establishes a replication relationship between each source data set and target data set pair. Accordingly, the replication relationship table may comprise an entry for each source data set identified by the source data module 202.

In some embodiments, the target data set includes a set of storage locations on a target volume. In certain embodiments, the target volume is a separate storage volume 125 in the data storage subsystem 120 than the source volume. In one embodiment, the mapping module 206 generates the replication relationship table by mapping the source data set to the target data set. In another embodiment, the mapping module 206 modifies an existing replication relationship table to map the source data set to the target data set.

In certain embodiments, the mapping module 206 may receive information identifying the target data set from the target data module 204. In certain embodiments, the mapping module 206 correlates the target data set to the source data set and stores the correlation in the replication relationship table. In some embodiments, the mapping module 206 may include a data set update module 214 for detecting changes to one or more source data sets included in the replication relationship table, as will be described hereafter.

The replication module 208, in one embodiment, is configured to perform an incremental copy of data stored at the source data set based on the replication relationship table. For example, the replication module 208 replicates data stored at the source data set to the target storage volume 125 at the target data set defined in the replication relationship table. In one embodiment, the replication module 208 periodically copies data from the source data set to target data set, for example, regularly performing an incremental flash copy using a data set incremental flash copy table (DIFT). In some embodiments, the replication module 208 performs the incremental copy of the source data set at a frequency defined by the replication relationship table. In certain embodiments, different source data sets may be copied at different frequencies. For example, a first source data set may contain critical user data and may be backed up at a higher frequency than a second source data set containing less important user data.

In one embodiment, the replication module 208 monitors for changes to the values (data) within each source data set defined in the replication relationship table. At a predetermined interval (e.g., at a frequency defined by the replication relationship table), the replication module 208 copies those changed values within the source data set to corresponding locations in the target data set defined in the replication relationship table. In some embodiments, the replication module 208 may include a policy module 216 that defines a replication policy for one or more source data sets included in the replication relationship table, as will be described hereafter.

The user interface module 210, in one embodiment, is configured to receive data set information from a user, for example, via the user device 130. The data set information may include one or more of a source name, a target name, a target device, and a storage group. In a certain embodiments, the user interface module 210 provides the data set information to the source data module 202, wherein the source data module 202 identifies the source data set based on the provided data set information. In some embodiments, the user interface module 210 provides the data set information to the mapping module 206, wherein the mapping module 206 identifies a replication relationship between a source data set and a target volume and/or target data set based on the data set information.

In some embodiments, the user interface module 210 receives, as data set information, a partially qualified data set name, wherein the source status module 202 identifies the source data set based on the partially qualified data set name. The partially qualified data set name may be a data set name having a wildcard character, wherein the source data set includes all data sets on the source volume matching the partially qualified data set name. In other embodiments, the data set information may include only fully qualified data set names, wherein the source status module 202 identifies a source data set based on each fully qualified data set name. In certain embodiments, the user interface module 202 provides the target name, the target device, and/or the storage group to the target data module 204, wherein the target data module 204 identifies and/or allocates the target data set based on the provided information.

In some embodiments, the user interface module 210 includes a human-to-machine interface allowing a user (e.g., an administrator of the data processing system 100) to provide instructions, commands, values, and/or definitions for replicating data in a source data set via an incremental flash copy. The user interface module 210 may be used to control the data copy manager 110 and/or the data set replication module 118. For example, the user interface module 210 may receive user input from the user device 130 in the form of instructions, commands, values, and/or definitions for incremental data set copying via the data copy manager 110 and/or the data set replication module 118. The user input may be in the form of system commands, keyboard input, mouse input, touchscreen input, or the like. In one embodiment, the user interface module 210 provides a graphical user interface (GUI) for display at the user device 130.

A storage group module 212, in one embodiment, is configured to identify a storage group associated with the source data set and/or the target data set. The storage group module 212 may receive data set information from the user interface module 210, including a storage group. Different classes of user data may be stored in different storage groups, and the storage group module 212 may associate the source data set with a particular storage group based on the class of user data contained in the source data set. Accordingly, the storage group module 212 may identify an appropriate storage group, wherein the target data module 204 allocates a target data set from an appropriate storage device in the storage subsystem 120 belonging to the identified storage group.

A data set update module 214, in one embodiment, is configured to monitor for changes to the source data set. In response to detecting a change to the source data set, the data set update module 214 may trigger the mapping module 206 to update the replication relationship table (e.g., a DIFT). In one embodiment, the data set update module 214 may also trigger the target data module 204 to update the target data set in response to a change to the source data set.

As used herein, changes to the source data set refers to changes to a definition of the source data set, such as changes to the storage volume 125 containing the source data set and/or changes to the set of storage locations corresponding to the source data set. The definition of the source data set may include a name of the source data set, a data track belonging to the source data set, an extent belonging to the source data set, a range of physical locations on a storage volume corresponding to the data set, or the like. Examples of changes to the source data set include, but are not limited to, adding storage locations to the source data set, deleting storage locations belonging to the source data set, and replacing storage locations of to the source data set with other storage locations on the source volume.

In certain embodiments, the data set update module 214 monitors for an extension to the source data set. As used herein, an extension to the source data set refers to the addition of storage locations (e.g., extents) to the source data set. In one embodiment, the data set update module 214 extends the target data set in response to an extension to the source data set. In another embodiment, the data set update module 214 may signal the target data module 204 to extend the target data set in response to an extension to the source data set. In response to the extensions to the source data set and the target data set, the mapping module 206 may update the replication relationship table so as to map the extended source data set to the extended target data set.

For example, if the data set update module 214 identifies an addition of three extents to the source data set, then the target data module 204 may allocate three additional extents on the target volume to the target data set and the mapping module 206 may update the replication relationship table to include both the updated source data set and the updated target data set. The target data module 204 may allocate the additional extents available locations on the target volume even if the target data set includes noncontiguous extents as a result.

In some embodiment, the data set update module 214 monitors for the deletion of a storage location (e.g., extent) to the source data set, wherein the target data module 204 removes a corresponding storage location (e.g., extent) from the target data set and the mapping module 206 updates the replication relationship table to delete an entry corresponding to the withdrawn source data set. For example, if the data set update module 214 identifies the deletion of extents from the source data set, then the target data module 204 may deallocate (e.g., delete) a corresponding number of extents from the target data set and the mapping module 206 may update the replication relationship table to reflect the updated source data set and the updated target data set. The deallocated target extents may be reallocated to other change to the source data sets. In one embodiment, all extents of the source data set may be deleted, wherein the mapping module 206 deletes from the replication relationship table the entry corresponding to the now empty source data set.

In certain embodiments, the data set update module 214 monitors for a withdrawal of the source data set, wherein the mapping module 206 updates the replication relationship table to delete an entry corresponding to the withdrawn source data set. In some embodiments, the data set update module 214 monitors for movement of the source data set. For example, the data set update module 214 may detect a withdraw command that refers to a source data set in the replication relationship table, wherein the mapping module 206 deletes the entry corresponding to the withdrawn source data set.

In one embodiment, the data set update module 214 may detect movement of the source data set. In response, the data set update module 214 may withdraw (delete) the incremental flash copy relationship for the source extents corresponding to the old source data set, identify new source extents corresponding to the moved source data set, and trigger an incremental flash copy relationship between the new source extents and the target data set, wherein the mapping module 206 updates the replication relationship table to reflect the new incremental flash copy relationship. In one embodiment, the target data module 204 may allocate new target data set to the moved source data set. In another embodiment, the target data module 204 may reallocate the same target data set to the moved source data set.

In certain embodiments, the data set update module 214 monitors for a new data set matching the partially qualified data set name and updates the source data set to include the new data set, wherein the mapping module updates the replication relationship table in response to the data set update module updating the source data set. In some embodiments, the data set update module 214 checks for changes to definitions of each source data set in the replication relationship table prior to the replication module 208 performing an incremental copy of data stored at the source data set. In a further embodiment, the data set update module 214 may periodically check for changes to the source data set between successive incremental copying by the replication module 208. For example the data set update module 214 may identify the frequency at which the source data set is incrementally copied and a check for changes to the source data set at the same frequency. In other embodiments, the data set update module 214 continually monitors for changes to definitions of a source data set and dynamically updates the replication relationship table in response to detecting a change.

A policy module 216, in one embodiment, is configured to define a replication policy for the source data set, wherein the replication module 208 copies data stored in the source data set according to the defined replication policy. In some embodiments, different source data sets are replicated at different intervals as defined by the replication policy. For example, a source data set whose data is frequently modified may be replicated at a different interval than a source data set whose data is in frequently modified. In certain embodiments, the replication policy indicates a time of day which the data stored in the source data set is replicated. In one embodiment, an entry in the replication relationship table includes a reference to the replication policy for the source data set.

Figure 3A:
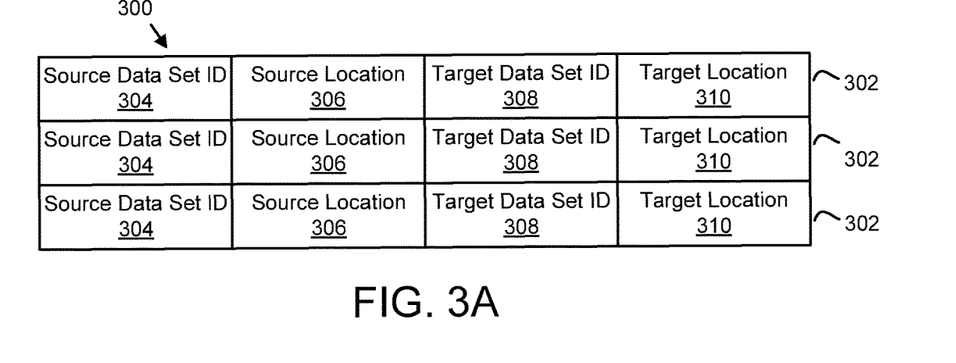
FIG. 3A is a schematic block diagram illustrating one embodiment of a data set incremental flash copy table in accordance with one embodiment of the present invention.

FIG. 3A is a schematic block diagram illustrating one embodiment of a data set incremental flash copy table (DIFT) 300. The DIFT 300 is a replication relationship table mapping one or more source data sets to a corresponding number of target data sets. The DIFT 300 maybe organized as a data structure, a database, or the like. The DIFT 300 may be stored in the data copy manager 110, the storage subsystems 120, or in combinations thereof.

The data set incremental flash copy table (DIFT) 300 includes a plurality of incremental replication relationships 302, such as a plurality of incremental flash copy relationships. Each incremental replication relationship 302 in the DIFT 300 describes an incremental flash copy relationship between a source data set and a target data set. In the depicted embodiment, each incremental replication relationship 302 includes a source data set identifier 304, a source data set location 306, a target data set identifier 308, and a target data set location 310.

The source data set identifier 304 identifies the source data set on the source volume. In one embodiment, the source data set is a named data set, wherein the source data set identifier 304 includes a logical name of the source data set. In a further embodiment, the data set identified may include a partially qualified data set name. In certain embodiments, the source data set identifier 304 is an index to the DIFT database and/or data structure. Similarly, the target data set identifier 308 may uniquely identify the target data set on the target volume and, in certain embodiments, may be a logical name of the target data set. In some embodiments, an incremental replication relationship 302 may also include an indicator of a target device or target storage group associated with the target data set and/or a replication policy for the incremental flash copy relationship.

The source data set location 306 indicates a logical and/or physical location of the source data set in the storage subsystem 120. For example the source data set location 306 may include such as a volume identifier and a range of extents where the source data set is located. Similarly, the target location 310 indicates the logical and/or physical location of the source data set in the storage subsystem 120. The source location data set 306 is described in further detail with reference to FIG. 3B, below. The target location 310 is described in further detail with reference to FIG. 3C, below.

Figure 3B:
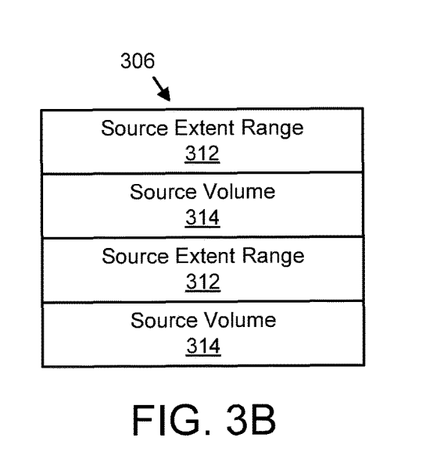
FIG. 3B is a schematic block diagram illustrating one embodiment of a source data set location information in accordance with one embodiment of the present invention.

FIG. 3B illustrates data structure for the source data set location 306. As described above with reference to FIG. 3A, the source data set location 306 describes the location of the source data set in the storage subsystem 120. In some embodiments, the source data set location 306 includes one or more source extent ranges 312 and a source volume identifier 314 of a storage volume 125 associated with each source extent range 312. In certain embodiments, the source data set may be spread over a plurality of storage volumes 125, wherein the source data set location 306 includes at least one pair of source extent range 312 and source volume identifier 314 for each of the plurality of storage volumes 125 associated with the source data set.

In one embodiment, a source extent range 312 describes a set of contiguous extents on a storage volume 125 belonging to the source data set. Where the source data set includes noncontiguous extents, the source data set location 306 will include a plurality of source extent ranges 312, each source extent range 312 identifying a set of contiguous extents. In another embodiment, the source extent range 312 identifies each extent belonging to the data set for a source volume identifier 314.

Changes to the source data set (e.g., changing the locations defining the source data set) are reflected in the source data set location 306. In one embodiment, the source data set location 306 is modified to include an additional source extent range 312 (and corresponding source volume identifier 314) in response to one or more extents being added to the source data set. In another embodiment, an existing source extent range 312 is adjusted to include one or more extents being added to the source data set. Likewise, the source data set location 306 may be modified to remove a source extent range 312 (and its corresponding source volume identifier 314) and/or a source extent range 312 may be updated in response to one or more extents being removed from the source data set.

Figure 3C:
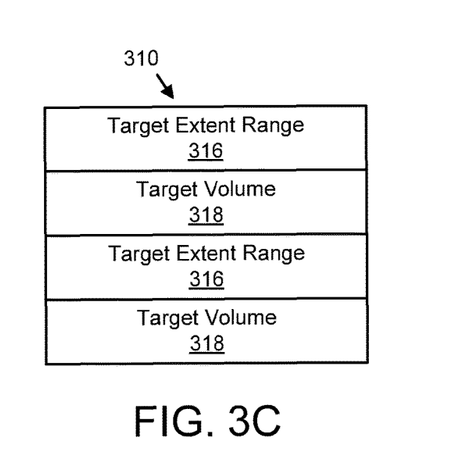
FIG. 3C is a schematic block diagram illustrating one embodiment of a target data set location information in accordance with one embodiment of the present invention.

FIG. 3C illustrates data structure for the target data set location 310. As described above with reference to FIG. 3A, the target data set location 310 describes the location of the target data set in the storage subsystem 120. In some embodiments, the target data set location 310 includes one or more target extent ranges 316 and a target volume identifier 318 of a storage volume 125 associated with each target extent range 316. In certain embodiments, the target data set may be spread over a plurality of storage volumes 125, wherein the target data set location 310 includes at least one pair of target extent range 316 and target volume identifier 318 for each of the plurality of storage volumes 125 associated with the target data set.

In one embodiment, a target extent range 316 describes a set of contiguous extents on a storage volume 125 belonging to the target data set. Where the target data set includes noncontiguous extents, the target data set location 310 will include a plurality of target extent ranges 316, each target extent range 316 identifying a set of contiguous extents. In another embodiment, the target extent range 316 identifies each extent belonging to the data set for a target volume identifier 318.

Changes to the target data set (locations defining the target data set) are reflected in the target data set location 310. The changes to the target data set may occur in response to changes in the source data set. In one embodiment, the target data set location 310 is modified to include an additional target extent range 316 (and corresponding target volume identifier 318) in response to one or more extents being added to the target data set. In another embodiment, an existing target extent range 316 is adjusted to include one or more extents being added to the target data set. Likewise, the target data set location 310 may be modified to remove a target extent range 316 (and its corresponding target volume identifier 318) and/or a target extent range 316 may be updated in response to one or more extents being removed from the target data set.

Figure 4:
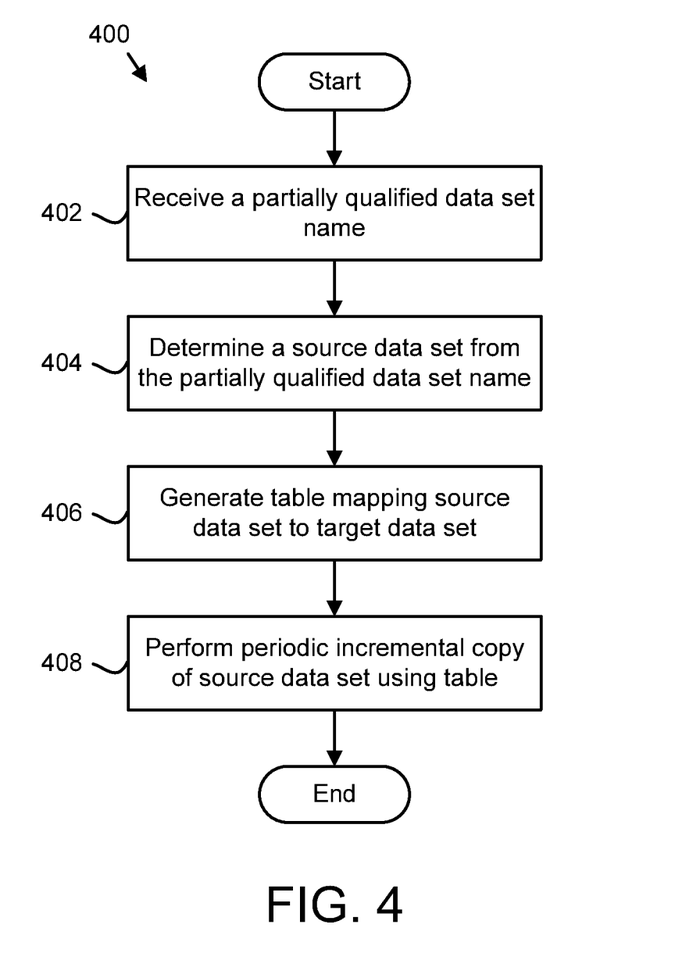
FIG. 4 is a schematic flow chart diagram illustrating one embodiment of a method for data replication in accordance with one embodiment of the present invention.

FIG. 4 is a schematic flow chart diagram illustrating one embodiment of a method 400. The method 400 may create the data set incremental flash copy table (DIFT) 300. The method 400 may be performed using the data set replication module 118. Alternatively, the method 400 may be performed by a computer program product. The computer program product may comprise a computer readable storage medium having program instructions embodied therein. The computer readable storage medium may be the memory 114, the storage subsystem 120, or combinations thereof. The program instructions may be readable/executable by the processor 112 to perform the method 400.

The method 400 starts, and in one embodiment, the source data module 202 receives 402 a partially qualified data set name identifying a source data set on a source volume. The source data module 202 determines 404 a source data set based on the partially qualified data set name. For example, the partially qualified data set name may comprise a data set name having a wildcard character, wherein the source data module 202 determines 404 a source data set including all data sets on the source volume matching the partially qualified data set name.

The mapping module 206 generates 406 a replication relationship table that maps the source data set to a target data set on a target volume. In one embodiment, the replication relationship table comprises a data set incremental flash copy table (DIFT). In another embodiment, generating 406 the replication relationship table may include the target data module 204 identifying and/or allocating a target data set on a target volume corresponding to the source data set.

The replication module 208 performs 408 an incremental copy of the data stored in the source data set based on the generated replication relationship table. In one embodiment, the replication module 208 performs 408 an incremental flash copy of the data stored in the source data set to the target data set. The method 400 ends.

Figure 5:
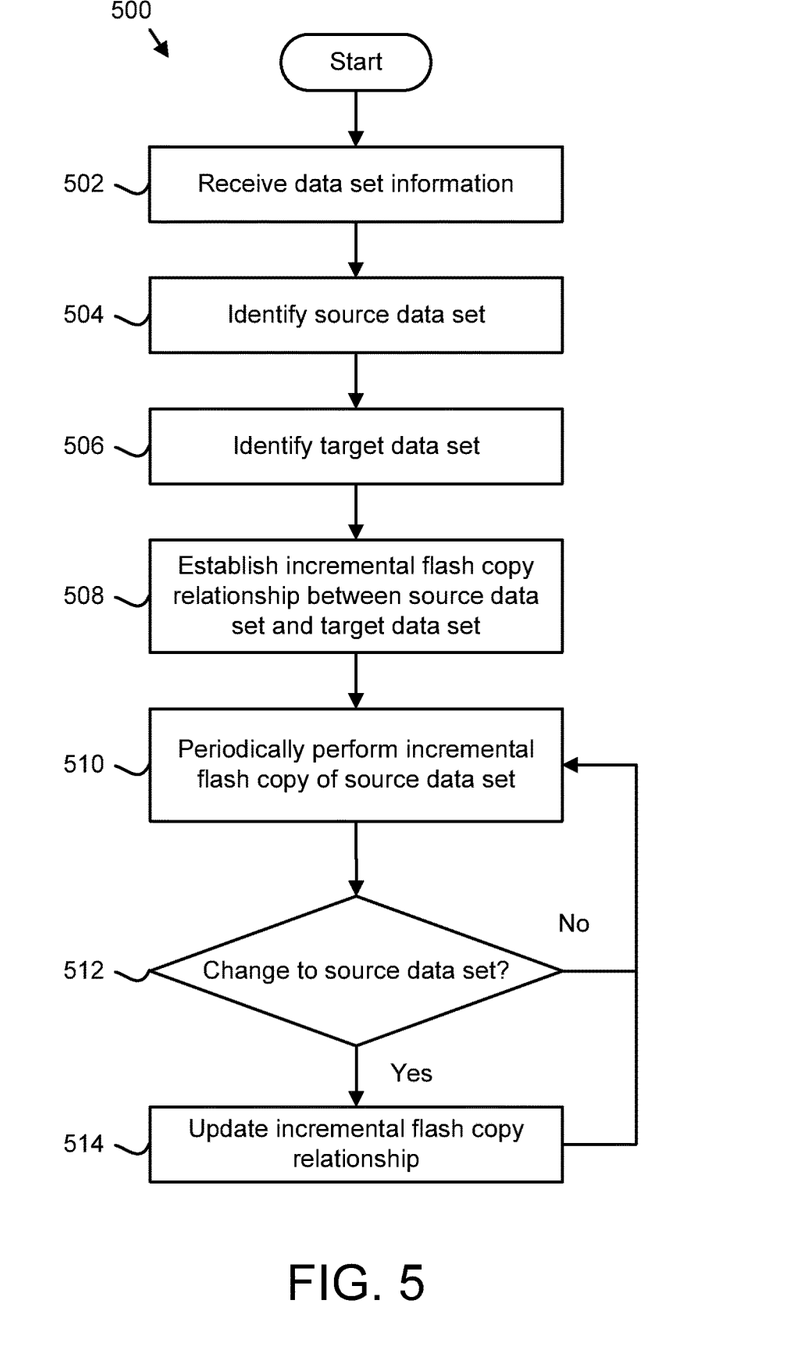
FIG. 5 is a schematic flow chart diagram illustrating one embodiment of a method for data replication in accordance with one embodiment of the present invention.

FIG. 5 is a schematic flow chart diagram illustrating one embodiment of an incremental data set replication method 500. The method 500 may create the data set incremental flash copy table (DIFT) 300 described above and perform incremental flash copy replication of a source data set based on the DIFT 300. The method 500 may be performed using the data set replication module 118. Alternatively, the method 500 may be performed by a computer program product. The computer program product may comprise a computer readable storage medium having program instructions embodied therein. The computer readable storage medium may be the memory 114, the storage subsystem 120, or combinations thereof. The program instructions may be readable/executable by the processor 112 to perform the method 500.

The method 500 begins and the user interface module 210 receives 502 data set information from a user (e.g., an administrator of the data processing system 100). The data set information may include one or more of a source data set name (such as a partially qualified data set name), a source volume, a target data set name, a target volume name, a target device, and/or a storage group. The source data module 202 identifies 504 a source data set based on the received data set information. In one embodiment, identifying 504 source data set includes identifying all data sets on the source volume matching a partially qualified data set name. In another embodiment, identifying 504 the source data set includes determining one or more extents associated with a received source data set name.

The target data module 204 identifies 506 a target data set corresponding to the source data set. In one embodiment, identifying 506 the target data set includes allocating one or more extents on a target volume and/or target device to the source data set identified 504 by the source data module 202. The mapping module 206 establishes 508 an incremental flash copy relationship between the source data set and the target data set. In one embodiment, establishing 508 the incremental flash copy relationship includes populating a data set incremental flash copy table (DIFT), such as the DIFT 300. The replication module 208 periodically performs 510 an incremental flash copy of data stored in the source data set. In one embodiment, performing 510 the incremental copy includes referencing information in the DIFT 300 to copy the source data set to the target data set. In certain embodiments, the replication module 208 periodically performs 510 the incremental copy at a frequency defined in the DIFT 300.

The data set update module 214 determines 512 whether a change is made to the source data set. In one embodiment, the data set update module 214 monitors 512 a definition of the source data set (e.g., the extents comprising the source data set) for changes to the definition of the source data set. Examples of changes to the source data set include: adding extents to the source data set, removing extents from the source data set, and moving the source data set. If the data set update module 214 detects a change to the source data set, then the mapping module 206 updates 514 the incremental flash copy relationship. Otherwise, if the data set update module 214 does not detect a change to the source data set, then the replication module 208 continues to periodically perform 510 the incremental flash copy of the source data set.

In response to the data set update module 214 detecting 512 a change to the source data set, the mapping module 206 updates 514 the replication relationship table based on the detected change. In one embodiment, updating 514 the replication relationship table based on the detected change may include allocating additional extents on a target volume/device to the target data set and/or removing extents from the target data set, for example in response to an addition or subtraction of extents of the source data set. In another embodiment, updating 514 the replication relationship table may include withdrawing an existing replication relationship in response to the change comprising the removal of all extents from the source data set. In yet another embodiment, updating 514 the replication relationship table based on a detected change may include withdrawing an existing replication relationship, re-identifying the source data set and target data set, and a establishing a new replication relationship between the source data set and the target data set. In one embodiment, the method 500 continues until there are no source data sets having an incremental flash copy relationship with the target data set (e.g., until all incremental flash copy relationships have been withdrawn).

Figure 6:
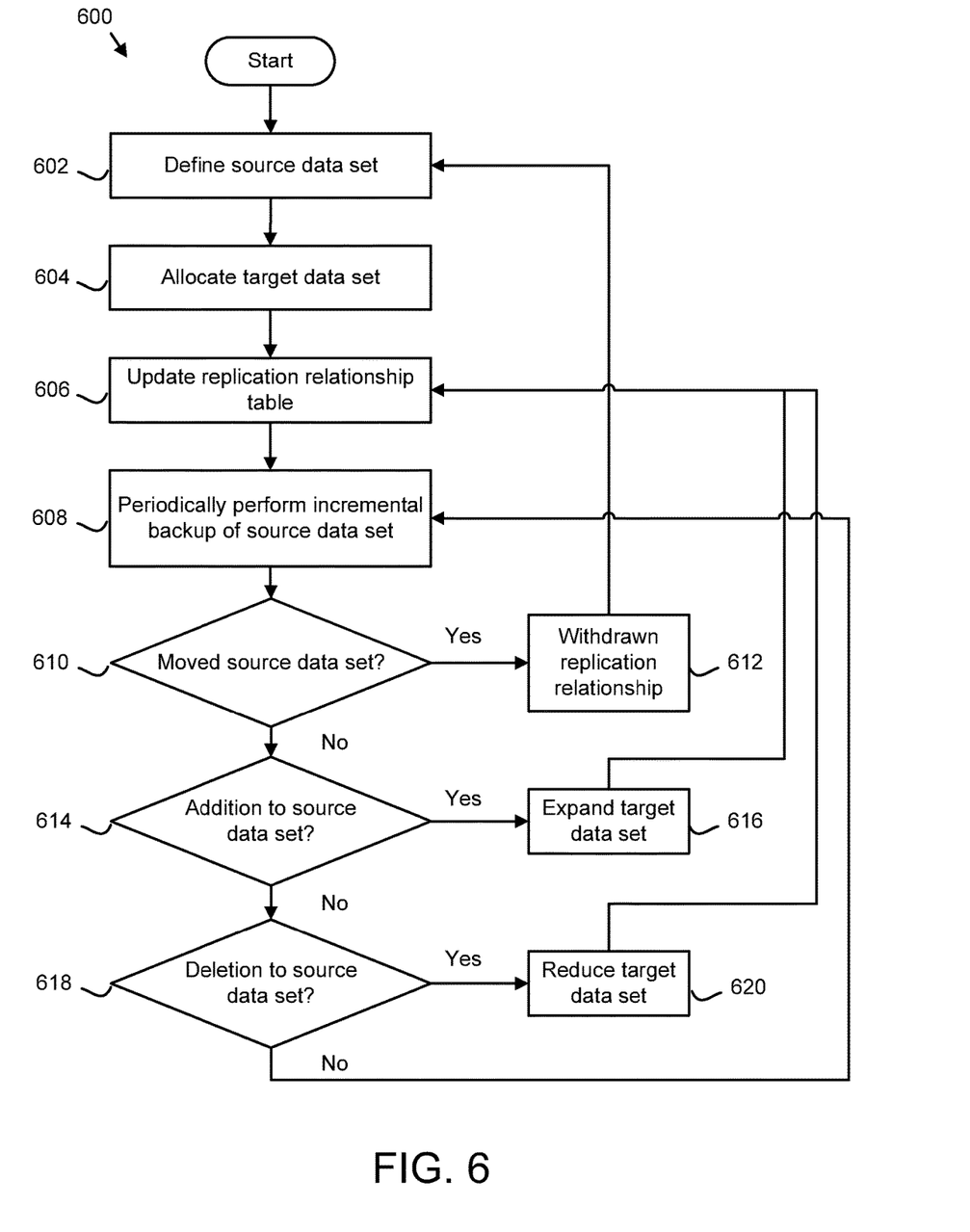
FIG. 6 is a schematic flow chart diagram illustrating one embodiment of a method for data replication in accordance with one embodiment of the present invention.

FIG. 6 is a schematic flow chart diagram illustrating one embodiment of an incremental data set replication method 600. The method 600 may create the data set incremental flash copy table (DIFT) 300 described above and perform incremental flash copy replication of a source data set based on the DIFT 300. The method 600 may be performed using the data set replication module 118. Alternatively, the method 600 may be performed by a computer program product. The computer program product may comprise a computer readable storage medium having program instructions embodied therein. The computer readable storage medium may be the memory 114, the storage subsystem 120, or combinations thereof. The program instructions may be readable/executable by the processor 112 to perform the method 600.

The method 600 starts, and in one embodiment, the source data module 202 defines 602 a source data set. The source data module 202 may receive a partially qualified data set name and define 602 the source data set to include all data sets on the source volume matching the partially qualified data set name. The target data module 204 allocates 604 a target data set on a target volume corresponding to the source data set. In some embodiments, the target data module 204 allocates 604 a target data set based on the received data set information, such as a target name and/or a target device.

The mapping module 206 updates the replication relationship table based on the defined source data set in the allocated target data set. In some embodiments, the replication relationship table is a data set incremental flash copy table, such as the DIFT 300 described above with reference to FIG. 3. Updating 606 the replication relationship table may include adding a new entry correlating the defined source data set with the allocated target data set. The replication module 208 periodically performs 608 an incremental copy (e.g., an incremental flash copy) of data stored in the source data set. In one embodiment, performing 608 the incremental copy includes referencing information in the DIFT 300 to copy the source data set to the target data set. In certain embodiments, the replication module 208 periodically performs 608 the incremental copy at a frequency defined in the DIFT 300.

The data set update module 214 determines 610 whether movement of the source data set occurs. For example, if the data set may be moved to a new location on the source volume (or alternatively, to a different storage volume 125). As another example, the logical name of the data set may be assigned to a different set of extents, thus moving the location of the source data set. In response to the data set update module 214 detecting movement of the source data set, the data set update module 214 withdraws 612 the replication relationship between the source data set and the target data set (thereby ending incremental copying of the originally defined extents of the source data set), the source data module 202 redefines 602 the source data set, the target data module 204 reallocates a target data set to the source data set, and the mapping module 206 updates 606 the replication relationship table.

If the data set update module 214 does not detect 610 movement of the source data set, then the data set update module 214 determines 614 whether an addition occurs to the source data set. For example, the data set update module 214 may detect modification to the source data set comprising the addition of one or more extents the source data set. In response to the data set update module 214 detecting an addition to the source data set, the target data module 204 expands 616 the target data set (e.g., allocates additional extents to the target data set) and the mapping module 206 updates 606 the replication relationship table.

If the data set update module 214 does not detect an addition to the source data set, then the data set update module 214 determines 618 whether a deletion occurs to the source data set. For example, the data set update module 214 may detect modification to the source data set comprising the deletion of one or more extents from the source data set. In response to the data set update module 214 detecting a deletion to the source data set, the target data module 204 reduces 620 the target data set (e.g., removes one or more extents from the target data set) and the mapping module 206 updates 606 the replication relationship table.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a source data module that identifies a first source data set from a partially qualified data set name, the first source data set including a first set of extent ranges on a first source volume, the first source volume comprising a plurality of data sets including the first source data set and additional data sets different than the first source data set;

a target data module that defines a first target data set in response to the source data module identifying the first source data set, the first target data set including a second set of extent ranges on a target volume;

a mapping module that stores a replication relationship table, the replication relationship table comprising a plurality of incremental flash copy relationships and indicating a replication policy corresponding to each incremental flash copy relationship, wherein each incremental flash copy relationship comprises an identifier of a source data set, a set of extent ranges corresponding to the identified source data set, an identifier of a target data set corresponding to the identified source data set, and a set of extent ranges belonging to the identified target data set, wherein the mapping module maps the first source data set to the first target data set and indicates a replication policy for the first source data set to form a first incremental flash copy relationship;

a replication module that periodically performs an incremental copy of data stored at the source data sets defined in the replication relationship table based on the replication policies stored in the incremental flash copy relationship, wherein different source data sets are replicated at different intervals based on the corresponding replication policies; and a data set update module that detects an end-of-volume request, wherein the data set update module monitors for addition of a third set of one or more extent ranges on a second source volume to the first source data set in response to the end-of-volume request, and wherein the data set update module monitors for removal of one or more extent ranges from the first source data set in response to the end-of-volume request, the second source volume different than the first source volume, wherein the target data module allocates a fourth set of one or more additional extent ranges on the target volume in response to detecting the addition of one or more extent ranges to the first source data set, wherein the mapping module updates the first incremental flash copy relationship to include the third set of extent ranges on a second source volume and to include the fourth set of one or more additional extent ranges on the target volume, wherein the target data module deallocates one or more extent ranges on the target volume in response to the removal of one or more extent ranges from the first source data set, and wherein the mapping module updates the first incremental flash copy relationship to remove from the first target data set the one or more extent ranges on the target volume corresponding to the deallocated one or more extent ranges, wherein at least a portion of the source data module, the target data module, the mapping module, the data set update module, and the replication module comprise one or more of hardware and executable code, the executable code stored on one or more computer readable storage media.

2. The apparatus of claim 1, wherein the data set update module further monitors for an extension to the first source data set in response to the end-of-volume request, wherein the mapping module updates the replication relationship table in response to the extension to the first source data set.

3. The apparatus of claim 2, wherein the data set update module extends the first target data set in response to an extension to the first source data set, the replication relationship table mapping the extended source data set to the extended target data set.

4. The apparatus of claim 2, wherein the data set update module monitors for an extension to the first source data set between successive iterations of copying the first source data set.

5. The apparatus of claim 1, wherein the data set update module further monitors for changes to the first source data set in response to the end-of-volume request, wherein the mapping module updates the replication relationship table in response to a change to the first source data set, the change in the first source data set being selected from the group consisting of: adding extent ranges on the first source volume to the first source data set and replacing extent ranges of the first source data set with other extent ranges on one of the first source volume and the second source volume.

6. The apparatus of claim 1, wherein the data set update module that monitors for a withdrawal of the first source data set in response to the end-of-volume request, wherein the mapping module updates the replication relationship table to delete an entry corresponding to the withdrawn source data set.

7. The apparatus of claim 1, wherein the data set update module further monitors for a new data set matching the partially qualified data set name and updates the first source data set to include the new data set, wherein the mapping module updates the replication relationship table in response to the data set update module updating the first source data set.

8. The apparatus of claim 1, further comprising a user interface module that receives data set information from a user, the data set information selected from the group comprising: a target name, a target device, and a storage group, wherein the target data module defines the first target data set based on the data set information.

9. The apparatus of claim 1, wherein the partially qualified data set name comprises a data set name having a wildcard character, wherein the first source data set includes all data sets on the first source volume matching the partially qualified data set name and all data sets on the second source volume matching the partially qualified data set name.

10. A method for data replication comprising:
receiving a partially qualified data set name;
determining a first source data set on a first source volume based on the partially qualified data set name, the first source volume comprising a plurality of data sets including the first source data set and additional data sets different than the first source data set;
allocating a first target data set on a target volume in response to identifying the first source data set, the first target data set including a set of extent ranges on a target volume;
adding a first incremental flash copy relationship corresponding to the first source data set and the first target data set to a replication relationship table comprising a plurality of incremental flash copy relationships and an indication of a replication policy corresponding to each incremental flash copy relationship,
wherein adding the first incremental flash copy relationship comprises mapping the first source data set to the first target data set and indicating a replication policy for the first source data set, each incremental flash copy relationship in the replication relationship table comprising an identifier of a source data set, a set of extent ranges corresponding to the identified source data set, an identifier of a target data set corresponding to the identified source data set, and a set of extent ranges belonging to the identified target data set;
performing an incremental copy of data stored at the source data sets defined in the replication relationship table based on the replication policies stored in the incremental flash copy relationship, wherein different source data sets on the first source volume are replicated at different intervals based on the corresponding replication policies;
detecting an end-of-volume request;
monitoring for addition of a third set of one or more extent ranges on a second source volume to the first source data set in response to the end-of-volume request, the second source volume different than the first source volume;
allocating a fourth set of one or more additional extent ranges on the target volume in response to detecting the addition of the third set of extent ranges to the first source data set;
updating the first incremental flash copy relationship to include the third set of extent ranges on a second source volume and to include the fourth set of additional extent ranges on the target volume;
monitoring for removal of one or more extent ranges from the first source data set in response to the end-of-volume request;
deallocating one or more extent ranges of the target volume in response to removing one or more extent ranges from the first source data set; and
updating the first incremental flash copy relationship to remove from the first incremental flash copy relationship the one or more extent ranges on the target volume corresponding to the deallocated one or more extent ranges.

11. The method of claim 10, further comprising;
monitoring for a change to the first source data set in response to the end-of-volume request, the change to the first source data set comprising one or more of: the addition of a storage location to the first source data set, the replacement of a storage location in the first source data set with another storage location, the detection of a new data set matching the partially qualified data set name, movement of the first source data set, and an extension of the first source data set; and
updating the replication relationship table in response to a change to the first source data set.

12. The method of claim 11, wherein performing an incremental copy of data stored in the source data sets defined in the replication relationship table comprises periodically copying changed data stored in the first source data set, wherein updating the replication relationship table occurs between successive iterations of incrementally copying the source data sets defined in the replication relationship table.

13. The method of claim 11, wherein updating the replication relationship table comprises allocating additional storage space to the first target data set in response to an extension of the first source data set.

14. The method of claim 10, further comprising:
identifying address locations on the first source volume belonging to the first source data set responsive to identifying the first source data set; and
allocating address locations on the target volume for the first target data set responsive to identifying the address locations on the first source volume, wherein the replication relationship table associates address locations belonging to the first source data set with address locations on the target volume.

15. The method of claim 10, further comprising deleting an entry in the replication relationship table associated with the first source data set in response to a withdrawal of the first source data set from incremental copying.

16. The method of claim 10, wherein performing an incremental copy of data from the first source data set to the first target data set comprises creating an incremental flash copy of the first source data set.

17. The method of claim 10, further comprising:
monitoring for deletion of the first source data set in response to the end-of-volume request, and
deleting the incremental flash copy relationship between the first source data set and the first target data set in response to deletion of the first source data set.

18. A computer program product for data replication, the computer program product comprising a computer readable storage medium having program instructions embodied therewith, the program instructions readable/executable by a processor to cause the processor to:
identify, by processor, a first source data set on a first source volume based on a partially qualified data set name, the first source data set including a first set of extent ranges on the first source volume, the first source volume comprising a plurality of data sets including the first source data set and additional data sets different than the first source data set;
allocate, by processor, a first target data set on a target volume in response to identifying the first source data set, the first target data set including a second set of extent ranges on a target volume;
add, by processor, a first incremental flash copy relationship corresponding to the first source data set and the first target data set to a replication relationship table comprising a plurality of incremental flash copy relationships and indicating a replication policy corresponding to each incremental flash copy relationship, wherein adding the first incremental flash copy relationship comprises correlating the first source data set with the first target data set and indicating a replication policy for the first source data set, each incremental flash copy relationship in the replication relationship table comprising an identifier of a source data set, a set of extent ranges corresponding to the identified source data set, an identifier of a target data set corresponding to the identified source data set, and a set of extent ranges belonging to the identified target data set;
perform, by processor, an incremental copy of data stored in the source data sets defined in the replication relationship table based on the replication policies stored in the incremental flash copy relationship, wherein different source data sets on the first source volume are replicated at different intervals based on the corresponding replication policies;
detect, by processor, an end-of-volume request;
monitor, by processor, for an addition of one or more extent ranges on a second source volume to the first source data set in response to the end-of-volume request, the second source volume different than the first source volume;
allocate, by processor, one or more additional extent ranges on the target volume in response to detecting the addition of one or more extent ranges to the first source data set;
update, by processor, the first incremental flash copy relationship to include the one or more extent ranges on a second source volume and to include additional extent ranges on the target volume;

monitor, by processor, for a removal of one or more extent ranges from the first source data set in response to the end-of-volume request;

deallocate, by processor, one or more extent ranges on the target volume in response to the removal of one or more extent ranges from the first source data set; and update, by processor, the first incremental flash copy relationship in response to a change to the first source data set, wherein updating the relationship table includes removing from the first target data set the one or more extent ranges on the target volume corresponding to the deallocated one or more extent ranges.

19. The computer program product of claim 18, wherein monitoring for a change to the first source data set further comprises monitoring for movement of the first source data set and wherein updating the relationship table comprises:

identify a new extent range corresponding to the moved source data set; and associate the new extent range with the first target data set in response to the movement of the first source data set.

20. The computer program product of claim 18, wherein monitoring for a change to the first source data set further comprises monitoring for an extension of the first source data set and wherein updating the relationship table comprises:

identify a new extent range corresponding to the extended source data set;

extend the first target data set based on the new extent range; and associate the extended source data set with the extended target data set.

* * * * *